June 18, 1968 D. C. WALLACE 3,388,975
APPARATUS FOR COLORIMETRIC GAS ANALYSIS
AND METHOD FOR MAKING SAME
Filed June 16, 1964
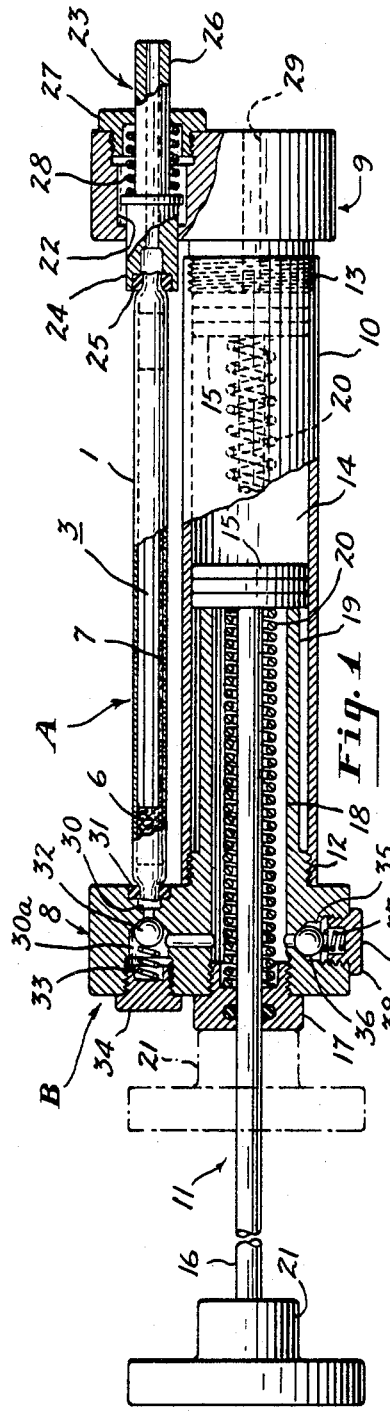
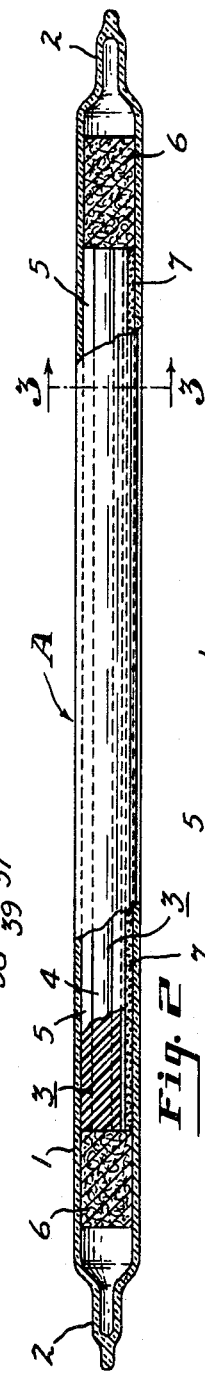
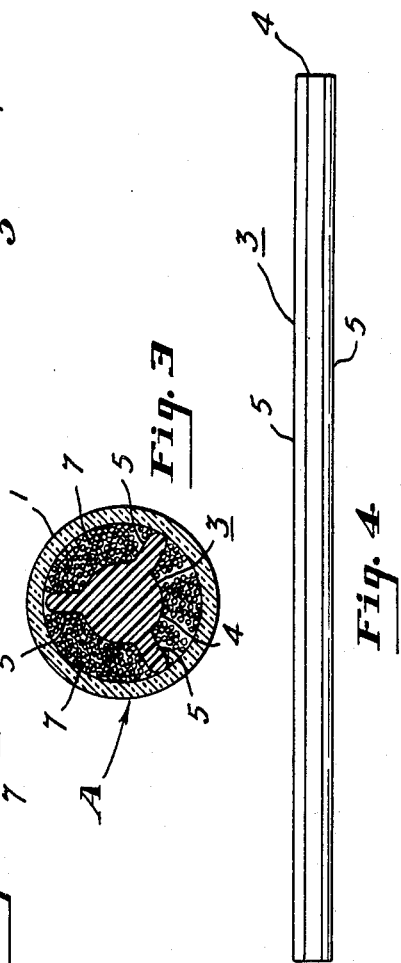
INVENTOR
Donald C. Wallace
BY McCoy, Greene, Medert
 + Te Grotenhuis
ATTORNEYS

United States Patent Office 3,388,975
Patented June 18, 1968

3,388,975
APPARATUS FOR COLORIMETRIC GAS ANALYSIS
AND METHOD FOR MAKING SAME
Donald C. Wallace, Novelty, Ohio, assignor to The Barber Manufacturing Company, County of Cuyahoga, Ohio, a corporation of Ohio
Filed June 16, 1964, Ser. No. 375,538
9 Claims. (Cl. 23—254)

ABSTRACT OF THE DISCLOSURE

An apparatus for the colorimetric quantitative analysis of gas mixtures characterized by the use of an indicator tube containing a porous column of granulated material coated with a reagent that changes color on contact with a given gas and also containing an axially centered elongated permeable pin which is permeated with an activator for the reagent.

This invention relates to an improved apparatus for the visual detection and quantitative determination of a gas in a gaseous mixture and, more particularly, to an improved colorimetric device for measuring the concentration of a particular gas in a measured volume of a gaseous mixture.

Some of the most effective devices used for colorimetric quantitative analysis of gaseous mixtures provide for the passage of a measured volume of a gaseous mixture through a transparent indicator tube containing a porous column of granular material which carries a reagent that changes color upon contact with the gas or vapor to be detected and measured. The distance along the column of granular material over which a color change occurs, in relation to the total length of the column, provides a visual measure of the quantity of the particular gas dispersed in the mixture. Such devices are often used for the detection and quantitative determination of such gases as oxygen, carbon dioxide, carbon monoxide and hydrogen sulfide in air and other gaseous mixtures.

An example of an effective device and reagent for use in measuring the concentration of oxygen in a gaseous mixture is shown in U.S. Patent No. 3,119,670. Other devices and materials useful for measuring the concentrations of such gases as hydrogen sulfide and carbon monoxide are shown in U.S. Patent Nos. 2,174,349, 2,487,077 and 2,569,895.

In these devices, a gaseous mixture to be analyzed is normally caused to pass through a porous column of inert particulate support material coated or impregnated with a chemical which reacts quantitatively with the gas component to be measured and which changes color upon reaction with the gas. If conditions such as the character and concentration of the stain reactive chemical cross-sectional area of the column of support material, and volume of the fluid mixture passed through the porous column are fixed, the distance over which the color change occurs will be a direct measure of the concentration of the particular gas in the mixture. Normally, a calibrated scale is provided with the device to provide a means for translating the length of the stained portion of the column to a percentage value or some other unit of measurement.

Generally, the coated support material is loaded in a transparent glass indicator tube which is hermetically sealed at both ends with frangible tips, which can be broken to permit the passage of the gaseous mixture through the tube and its porous column of support material. The gaseous mixture is usually drawn through the testing tube using an aspirator or other suitable means.

When an aspirator is used, it is preferably of a construction including a piston which may be cocked by the operator and then driven throughout an intake stroke by some standard force each time such as by a coil spring. This arrangement which is a part of the present invention, eliminates variations and errors introduced by differences in personal techniques among operators.

Since the colorimetric measurement of gas concentration is based on the quantitative reaction of the particular gas component and the indicator, i.e., coating on the support material in the indicator tube, the volume tolerances of the indicator tubes are important. The linear measurement of the reacted indicator can be very accurate, but the accuracy of the linear calibration in terms of gas concentration is dependent on the cross-sectional area of the column (or tube) and on the tolerances or variations in this area. It must be assumed that the variations in the cross-sectional area of the indicator column coincide with the variations in the internal cross-sectional area of the indicator tube. As the length of the reacted indicator column increases, the effect of any cross-sectional area variations decreases. Because of this, an indicator tube of a certain length will give a more accurate reading as more of its indicator reacts. Thus, an indicator tube designed to detect a maximum of 20% concentration of a gas in a mixture will be substantially less accurate measuring a 4% concentration of that gas than will an indicator tube of the same length designed to detect a maximum of 5% concentration. On the other hand, decreasing the designed capacity of an indicator tube having a fixed length requires reduction of the cross-sectional area, i.e., the inside diameter, of the tube. Such a reduction not only becomes increasingly difficult to accomplish by commonly used manufacturing techniques, but holding cross-sectional area variations within reasonable tolerances becomes extremely difficult if not impossible.

The device of the present invention presents a novel solution to these problems by providing an elongated pin of a precalculated size within the indicator tube, which reduces the portion of the cross-sectional area within the tube available for the column of support material. The pin, together with the cylindrical wall of the indicator tube defines a passage of smaller cross-sectional area for the gaseous mixture while at the same time, radially expanding the peripheral surface to be used for providing the visual indication to be read against the calibrated scale. A thermosetting plastic material is normally used for the pin since it may be extruded within very close dimensional tolerances.

The pin is centrally located within the indicator tube and is preferably provided with three or more longitudinal spacer ribs uniformly spaced around its periphery. The granular support material is thus confined in the annular zone between the outer surface of the pin and the wall of the indicator tube. Thus, by using pins of various sizes, indicator tubes of a uniform size may be adapted for measuring gas concentrations throughout different ranges.

It is also a part of the invention to utilize the plastic pin as a vehicle for introducing a material in gaseous or vapor form to activate the indicator coating on the granular support material. For example, one material used for measuring oxygen concentration in a gaseous mixture is an inert support material such as alumina coated with ammoniated copper, as described in U.S. Patent No. 3,119,670. The oxygen reacts with the ammoniated copper to produce a brilliant blue stain which contrasts sharply with the unreacted material. In applying the ammoniated copper to the support material, the support material is normally first coated with copper by one of the methods known in the art and then dipped in an ammonium hydroxide solution to cover the elemental copper coating with wet ammonia, which after a sufficient period of time impregnates the copper.

The step of applying the ammonia may be eliminated, however, in indicator tubes of the present invention by soaking the plastic pin in ammonium hydroxide prior to assembly of the indicator tube. Then, after the tube has been assembled and sealed, a controlled amount of the vapor is liberated from the plastic at a slower and more exact rate to impregnate the copper coating. Indicator tubes prepared in this way are less costly to produce due to the elimination of a difficult manufacturing step and provide a sharper, more sensitive stain reaction due to the fact that the impregnated copper is confined in a saturated atmosphere without exposure to any other gases except the gas to be tested.

This technique may also be used in the manufacture of indicator tubes for measuring carbon dioxide concentration. The reagent applied to the support material is sodium carbonate subsequently coated with thymolphthalein and the activator used is water vapor. In this case, the plastic pin is soaked with steam so that water vapor is released after the tube is assembled and sealed.

It is among the objects of the present invention to provide an improved apparatus for the visual detection and quantitative determination of a gas in a gaseous fluid mixture which affords greater accuracy in the readings obtained.

Another object of the present invention is to provide an indicator tube for visually determining the concentration of a gas in a gaseous mixture such that ratio of the effective cross-sectional area of the tube to the circumference of the tube is substantially less than that of presently available tubes.

Another object of the present invention is to provide a device for the visual detection and quantitative determination of a gas in a gaseous mixture wherein the device may be adapted for various ranges of gas concentration in a standard glass tube of uniform size by the use of plastic pins of various sizes centrally fixed within the glass tube.

Other objects, uses and advantages of the invention will become apparent from the following detailed description and drawings wherein:

FIGURE 1 is a side elevation of an indicator tube and an aspirator with parts broken away and shown in section, the piston of the aspirator being shown in its inward position in dashed lines and in its outward actuated condition in solid lines;

FIGURE 2 is an enlarged side elevation of an indicator tube embodying the present invention with parts broken away and shown in section;

FIGURE 3 is an enlarged transverse section taken on the line 3—3 of FIGURE 2;

FIGURE 4 is a side elevation of a typical plastic pin embodied in the present invention.

More particularly, FIGURE 1 shows an indicator tube A ready for use in an aspirator B. The indicator tube A generally comprises a hermetically sealed cylindrical glass ampoule 1 having frangible tips 2 at each end as best shown in FIGURE 2. The frangible tips 2 are easily broken when the indicator tube is to be used to provide openings for the passage of a gaseous mixture to be analyzed through the ampoule 1. Ampoules may be conveniently prepared of "Pyrex" glass tubing, preferably having an internal diameter of between .1 and .3 inch.

Centrally located within the ampoule 1 is an elongated plastic pin broadly indicated by the numeral 3. The pin 3 includes a cylindrical body portion 4, which has a suitable diameter to provide a predetermined range of gas concentration values for the indicator tube, and radially projecting spacer ribs 5, which extend throughout the length of the pin 3 for centrally locating the pin 3 within the ampoule 1.

Adjacent the ends of the pin 3 at each end of the ampoule 1 are porous plugs 6 for accurately centering the pin longitudinally in the ampoule 1. The plugs 6 may be formed of cotton, rigid foam, or other porous material.

Packed around the pin 3 is a porous column of inert particulate support material 7 coated with a stain reactive chemical which reacts with the particular gas to be detected and measured. Both the plugs 6 and the column of inert particulate support material 7 are sufficiently porous to allow passage of the gaseous mixture to be analyzed. Thus, when the frangible tips 2 have been broken to open the ends of the ampoule 1, the indicator tube can be placed in a suitable aspirator, such as the aspirator B shown in FIGURE 1, and a measured volume of the gaseous mixture can be drawn through the indicator tube.

The aspirator B generally comprises a rearward end member 8, a forward end member 9, a cylinder 10 and a piston 11. The end members 8 and 9 each have a threaded shank portion 12 and 13, each of which screws into one end of the cylinder 10. The cylinder 10 and the end members 8 and 9 form a cylindrical chamber 14 which receives the head 15 of the piston 11. The head 15 of the piston 11 is in sealing contact with the wall of the cylinder 10 and is mounted for reciprocating movement to provide for the intake and exhaustion of air in the chamber 14. The rod 16 of the piston 11 is slidably received in a circular bore 18 of a threaded bushing 17 which is threadedly received in the end member 8. The rearward movement of the piston 11 is limited by a shank portion 19 of the end member 8, as shown in FIGURE 1. A coil spring 20 bears against the bushing 17 and against the piston head 15, biasing the piston 11 towards the inward position shown in dashed lines in FIGURE 1. In this position, the handle 21 of the piston 11 bears against the bushing 17, limiting the inward movement thereof.

Located in a circular bore 22 in the forward end member 9 is a probe 23 having a passageway therethrough to provide for the entry of the gaseous fluid mixture to be tested. The probe 23 is slidably received in the bore 22 and the rear portion 24 thereof provides a seat for the indicator tube A. A rubber washer 25 mounted in the rear portion 24 of the probe 23 provides an airtight seal between the probe 23 and the indicator tube A, so that a gaseous fluid mixture entering through the probe will be directed through the tube A.

The forward portion 26 of the probe 23 passes through a circular bore in a threaded bushing 27, threadedly received in the forward end member 9 and a coil spring 28 within the bore 22 bears against the inner face of the bushing 27 and a flanged portion of the probe 23 biasing the probe 23 toward the rear of the aspirator B to maintain the rear portion 24 in sealing engagement with the end of the glass tube A.

A circular passage 29 in the forward end member 9 communicates with the forward portion of the chamber 14 and provides for the free entry of air into the front end of the chamber 14 when the piston 11 is pulled to its rearward position shown in solid lines in FIGURE 1, and for the exhausting of air when the piston is returned to its forward position shown in dashed lines in FIGURE 1.

Located in the rearward end member 8 is an orifice 30 providing a seat for the rearward end of the glass tube A. A rubber washer 31 mounted in the orifice 30 provides an airtight seal between the indicator tube A and the end member 8 so that a gaseous fluid mixture passing through the indicator tube A will be directed through the orifice 30.

Located within a chamber 30a in the end member 8 is a ball valve 32 which is spring biased to a position sealing the orifice 30. The spring 33 bears against a plug 34 threadedly received in the end member 8. The chamber 30a communicates with the circular bore 18 within the rearward end member 8, thus providing a passage through the orifice 30 to the chamber 14 formed by the cylinder 10.

Located in the bottom portion of the rearward end member 8 is a chamber 35, which receives a ball valve 36 which is spring biased to seal a passage from the chamber 35 to the circular bore 18. The spring 37 bears against a plug 38 threadedly received in the bottom of the rearward end member 8. The plug 38 has an orifice 39 which communicates with the chamber 35.

In the operation of the aspirator B, the handle 21 is pulled outwardly to compress the spring 20 and bring the piston head 15 back to bear against the shank portion 19 of the end member 8. As the piston 11 is drawn back, the ball valve 36 opens and air from the chamber 14 is expelled therefrom through the orifice 39. When the piston 11 is fully retracted, the ball valve 36 closes.

When the handle is released, the spring 20 forces the piston 11 forward and the ball valve 32 opens to permit the gaseous mixture being analyzed to be drawn through the passage in the probe 23, through the indicator tube A, through the end member 8 and into the chamber 14. The pressure exerted by the spring 20 moves the piston at a controlled rate to its inward position, shown in dashed lines in FIGURE 1, and thus draws a measured volume of the gaseous mixture to be analyzed through the indicator tube.

That portion of the measured volume of the gaseous mixture which consists of the particular gas to be tested, will react with the stain producing reagent on the support material 7, beginning at the forward end of the column of colorimetric material, and extending longitudinally until the particular gas in the measured volume has been exhausted.

When the indicator tube is to be used for analyzing fluid mixtures wherein the concentration of the particular gas is relatively small, it would be desirable to have a column of support material which is effective over a narrow range, but with greater accuracy. In order to provide this narrow range, a pin having a body portion of relatively large diameter is selected in order to reduce the total amount of support material to be packed in the tube. This will obviously narrow the range over which the tube is effective, but will expand the scale used to measure the gas concentration so that a relatively small amount of the gas to be tested will cause a relatively long zone of stained support material, thus making the readings much more accurate within the narrow range for which the indicator tube is used.

When a higher concentration of the particular gas in the gaseous mixture is to be expected, a pin having a body portion of relatively small diameter is selected so that a greater quantity of support material may be packed in the indicator tube. This provides a wider range of values over which the tube may be used but compresses the scale so that readings may be made with somewhat less accuracy.

It will be seen that by varying the cross-sectional area of the pin the same size glass ampoule may be used for different ranges of gas concentration with the degree of accuracy being dependent upon whether the concentration is relatively large or relatively small.

The support material must be carefully selected depending to some degree on the particular gas to be tested. Normally, any inert material is satisfactory such as, for example, alumina, magnesia, silica and titania. It is essential that the support material be of generally uniform particle size in order to pack into a compact bed and still provide a porosity of the degree required for adequate flow of the gaseous mixture through the bed. Particle size is of relatively little importance so long as the particles are approximately uniform. While any particles measurable by standard sieves are operative, particles in the range of 120 to 140 mesh (U.S. sieve series) have been found to be satisfactory. Generally, however, the optimum particle size for any size bed and for the particular gas can be readily determined by simple experimentation.

When the indicator tube is to be used for analyzing oxygen or carbon dioxide concentrations, the insert may be soaked in either ammonia in the case of oxygen or steam in the case of carbon dioxide. The insert is then quickly placed in the ampoule in an atmosphere free of the gas to be tested, and the partially coated support material is packed around it. The porous end plug is then inserted and the ampoule sealed at its open end. The vapor or gas absorbed by the insert is then gradually released at a slow and controlled rate to impregnate the coating on the support material and complete the composition of the reagent.

In indicator tubes of the present invention, the support material 7 is generally packed in the ampoule 1 after one end of the ampoule has been sealed and after the insert has been positioned. After the ampoule is filled with the desired amount of support material, the open end is sealed to provide a frangible tip. The coated support material must be packed, of course, in an environment free from the gas with which the material is designed to react.

It is to be understood that the above description is by way of illustration rather than limitation and that, in accordance with provisions of the patent statutes, variations and modifications of the specific device herein shown and described, may be made without departing from the spirit of the invention. For example, the plastic pin can be replaced by a permeable pin of sintered alumina or other porous inert material, especially where an activator is to be employed.

The embodiments of the invention in which an exclusive property or privilege is claimed are defined as follows:

1. An indicator tube for colorimetric quantitative analysis of gaseous mixtures comprising a transparent ampoule hermetically sealed at each end, a porous column of granulated material within said ampoule, said material being coated with a reagent that changes color upon contact with a gas, and an elongated permeable pin located within said ampoule and being coextensive with said column of material, said pin being permeated with an activator for said reagent, said ampoule adapted to be opened at its ends to provide for the passage of a gaseous mixture to be analyzed therethrough.

2. In a hermetically sealed indicator tube containing a porous column of granular material impregnated with a reagent which when activated by an activator produces a stain reactive coating suitable for the colorimetric quantitative analysis of gaseous mixtures, an elongated permeable pin coextensive with said column of material, said pin being permeated with an activator for said reagent.

3. An indicator tube as defined in claim 2 wherein said reagent is copper and said activator is ammonium hydroxide.

4. An indicator tube as defined in claim 2 wherein said reagent is thymolphthalein on sodium carbonate and said activator is water vapor.

5. An apparatus for the colorimetric quantitative analysis of gaseous mixtures comprising an indicator tube containing a porous column of granulated material coated with a reagent that changes color upon contact with a gas and an elongated permeable pin axially centered therein, said pin being permeated with an activator for said reagent, and means for causing a measured volume of said gaseous mixture to pass through said tube.

6. An apparatus for the colorimetric quantitative analysis of gaseous mixtures comprising a transparent ampoule hermetically sealed at each end, a porous column of granulated material within said ampoule, said material being coated with a reagent that changes color upon contact with a gas, an elongated permeable pin located within said ampoule and being coextensive with said column of material, said pin being permeated with an activator for said reagent, said ampoule adapted to be opened at its ends to provide for the passage of a gaseous mixture therethrough and means for causing a measured volume of said gaseous mixture to pass through said ampoule.

7. A method of making an indicator tube for colorimetric quantitative analysis of gaseous mixtures comprising the steps of:
 (a) treating an inert granular material with a reagent which when activated by an activator changes color upon contact with a gas
 (b) permeating an elongated pin with an activator for said reagent
 (c) sealing said treated granular material and said permeated pin in a transparent ampoule.

8. A method of making an oxygen indicator tube for colorimetric quantitative analysis of gaseous mixtures comprising the steps of:
 (a) treating an inert granular material with copper
 (b) permeating an elongated pin with ammonium hydroxide
 (c) sealing said treated granular material and said permeated pin in a transparent ampoule.

9. A method of making a carbon dioxide indicator tube for colorimetric quantitative analysis of gaseous mixtures comprising the steps of:

(a) treating an inert granular material with sodium carbonate
 (b) treating said treated granular material with thymolphthalein
 (c) permeating an elongated pin with water vapor
 (d) sealing said treated granular material and said permeated pin in a transparent ampoule.

References Cited

UNITED STATES PATENTS

| | | | |
|---|---|---|---|
| 3,033,655 | 5/1962 | Grosskopf | 23—254 |
| 3,119,670 | 1/1964 | Mitchell et al. | 23—232 |
| 3,286,506 | 11/1966 | Lloyd | 23—254 X |

FOREIGN PATENTS

| | | |
|---|---|---|
| 932,750 | 9/1955 | Germany. |
| 15,885 | 7/1904 | Great Britain. |

MORRIS O. WOLK, *Primary Examiner.*

JOSEPH SCOVRONEK, ROBERT M. REESE,
*Examiners.*